US005779300A

United States Patent [19]

McNeilus et al.

[11] Patent Number: 5,779,300

[45] Date of Patent: Jul. 14, 1998

[54] MODULAR PACKER BODY

[75] Inventors: Garwin B. McNeilus, Dodge Center; Wilbur R. Harris, Rochester, both of Minn.

[73] Assignee: McNeilus Truck and Manufacturing, Inc., Dodge Center, Minn.

[21] Appl. No.: 788,428

[22] Filed: Jan. 28, 1997

[51] Int. Cl.[6] .......... B60P 1/00

[52] U.S. Cl. .......... 296/183; 414/513

[58] Field of Search .......... 296/183, 184, 296/196, 197, 101; 414/513; 105/239, 247, 248, 261.2

[56] References Cited

U.S. PATENT DOCUMENTS

| | | | |
|---|---|---|---|
| 3,034,824 | 5/1962 | Schubach | 296/183 |
| 4,909,564 | 3/1990 | Pfeifer et al. | 296/184 |
| 5,562,390 | 10/1996 | Christenson | 414/477 |

*Primary Examiner*—Jesus D. Sotelo

*Attorney, Agent, or Firm*—Haugen and Nikolai, P.A.

[57] ABSTRACT

A dedicated truck body selected from the group including top loading refuse vehicle bodies is fabricated using a plurality of discreet, independently removable and replaceable modular subassemblies for separate replacement in response to non-uniform wear and damage requirements.

9 Claims, 3 Drawing Sheets

MODULAR PACKER BODY

BACKGROUND OF THE INVENTION

I. Field of the Invention

The present invention relates generally to vehicles for collecting refuse and particularly to truck bodies having mechanisms dedicated to lifting and dumping refuse containers, and others for packing and ejecting refuse materials. Specifically, the invention deals with a modular truck body construction which allows individual replacement of a plurality of body subassemblies or parts obviating the necessity for expensive patch repairs or replacement of the entire truck body in response to unusual localized wear or damage.

II. Related Art

Trucks dedicated to perform particular tasks commonly include a heavily constructed structural chassis frame which provides the cab and the truck body support structure and further includes the engine, drive train and associated hydraulic systems and/or other power take-off mechanisms. The chassis is then generally combined with a permanently mounted single-function or dedicated truck body constructed as a separate unit. Thus, the chassis is designed to support a permanently attached delivery box, dump body or other special function truck body such as a refuse collection body including compaction lift and dump mechanism and ejection mechanisms dedicated to those functions once assembled.

Common types of refuse trucks include front-end loading and side-loading embodiments in which the refuse is top loaded just behind the cab in a charging hopper, compacted rearward and removed and discharged through a rear access. The front-end loading version is particularly adapted to pick up and dump large commercial refuse containers or storage bins in which the filled container is addressed at the front of the truck, picked up by a pair of side mounted lifting arms and fork arms which engage the container to raise it above the storage body of the refuse truck and invert it to dump its contents into a top opening in a truck body just behind the cab. The sequence of motion is then reversed and the empty refuse container is returned and replaced on the ground. The material received from the storage container is then compacted through the rearward movement of a compaction or packing panel behind the storage body. In the receiving position, the compaction panel is positioned forward and beneath the top opening and after the refuse is received in the body, the panel is advanced rearward to propel and compact the refuse into the rear storage section where it eventually compacts against a heavy tailgate which is hinged to the storage body to close a rear discharge opening. After the rearward motion of the compaction panel to propel the refuse, the panel is again moved forward in position to address and compact new refuse. In this manner, the rear portion of the storage container eventually becomes completely filled with compacted refuse which is later discharged at a landfill or other point of discharge.

FIG. 1 depicts a side view of a typical prior art front-end loading, rearward compacting refuse vehicle 10 which includes a cab section 12 mounted on a chassis 14 supported by a plurality of wheels 16. The vehicle includes a refuse storage reservoir 18 and a charging hopper/compacting section 20. The system further includes a pair of lifting arms, one of which is shown at 22, mounted on the forward section of the truck body 20, using pivotal mountings 24. Hydraulic cylinders 26 supported through pivotal clevis mountings as at 28 are connected to lever arm portions 30 of the lifting arms 22 through piston ends or rod ends 32 connected to pivotal mountings 34. As can be seen from the illustration, the cylinder 26 is fully retracted and the system is in its fully retracted position. Extension of the cylinders 26, which produces extension of rods 32, causes the lift arms 22 to move forward and deploy for picking up a full container or setting down an empty container.

The outer ends of lift arms 22 are provided with fork arms, one of which is shown at 36, connected by pivotal mountings, as at 38, with the fork arms 36 being rotatable with respect to the lifting arms 22 in accordance with the operation of a pair of hydraulic cylinders, one of which is shown at 40 procured between each of the lifting arms 22 as at 42 and the pivotal mounting 38 as at 44.

In operation, the fork arms 36, together with the lifting arms 22 cooperate in a well-known manner to engage lift and invert a side-handled refuse container box to be dumped into the charging hopper 20. A protective canopy 46 is positioned to protect the top of the cab from hazards associated with lifting and dumping containers which include spillage of refuse and even possible failure of the handles and dropping of a container itself. Within the truck body, the refuse receiving section or charging hopper 20 further contains a mechanical compacting system in which a vertically disposed packer (not shown) engages and pushes the material in the charging hopper 20 rearward into the storage reservoir 18 packing it against a heavy top pivoting tailgate 48 in a conventional and well-known manner.

While truck bodies of the class exemplified by FIG. 1, operate successfully, the unitary bodies suffer from several shortcomings. During thousands of lift and dump operations, the upper sections, particularly on those front-loading vehicles, often get damaged by being hit with containers being dumped into the charging hopper. In addition, front-loading vehicles emptying commercial dumpsters typically encounter such containers containing heavy materials such as large cast iron items or concrete chunks which can cause severe wear and damage to the floor of the hopper and storage reservoir. Such heavy parts can also fall from the container onto the cab canopy or spill shield causing damage there.

With current truck bodies of unitary welded construction, it is necessary to replace the entire truck body, in many cases, even though only a portion of the system is worn or damaged or even corroded. It would present a definite advantage if truck bodies such as the front-loading refuse body could be made of a modular manner such that individual rapid wear or commonly damaged components could be separately replaced to thereby save time and a great deal of money spent maintaining the truck body over the life of the packer.

Accordingly, it is a primary object of the present invention to provide a truck body constructed of a plurality of discreet, independently removable and replaceable subassemblies for separate replacement in response to non-uniform wear and damage requirements.

A further object of the invention is to provide a plurality of modular subassemblies for a truck body including a separate storage reservoir, upper charging hopper and lower charging hopper (including the hopper floor), tailgate, top door, windguard, loading forks, where applicable, and canopy.

A still further object of the present invention is to provide a truck body fabricated of a plurality of discreet, independently removable and replaceable modular subassemblies which are fastened together and to the vehicle chassis using removable fastening means.

Other objects and advantages of the invention will become apparent to those skilled in the art upon becoming familiar with the present specification, drawings and appended claims.

SUMMARY OF THE INVENTION

In accordance with the present invention, there is provided a dedicated refuse truck body fabricated in modular sections which can be separately removed and replaced in the event of wear or damage without removal or replacement of other sections in the modular assembly thereby enabling one to replace individual components and extend the life of the truck body at a reduced cost. In accordance with the invention, each of the modular sections can be manufactured to be identical and interchangeable so that spare hardware items or often-damaged items could be stocked for easy replacement. The concept contemplates the use of removable fasteners to connect the several modular elements that make up the entire truck body assembly, including, without limitation, storage reservoir, upper and lower charging hoppers, tailgate, top door, top door track, windguard canopy and forks, connecting torque tube with respect to a typical front-loading refuse truck body configuration.

Normally, the modular subassemblies of the invention are bolted together for easy removal and replacement with intermediate gaskets as required for body parts. Upon the damage or excessive wear of a particular modular subassembly, it can be simply unbolted, removed and replaced usually without disturbing the rest of the assembled truck body.

Whereas the concept of the invention is illustrated herein with regard to a front-loading refuse vehicle, the concept is appropriate for any such vehicle, particularly top loading refuse vehicles which include all types of side-loaders. These may also include modular mechanized loading devices which may be removably mounted to the truck chassis.

BRIEF DESCRIPTION OF THE DRAWINGS

In the drawings wherein like numerals designate like parts throughout the same.

DETAILED DESCRIPTION

Figure 1:
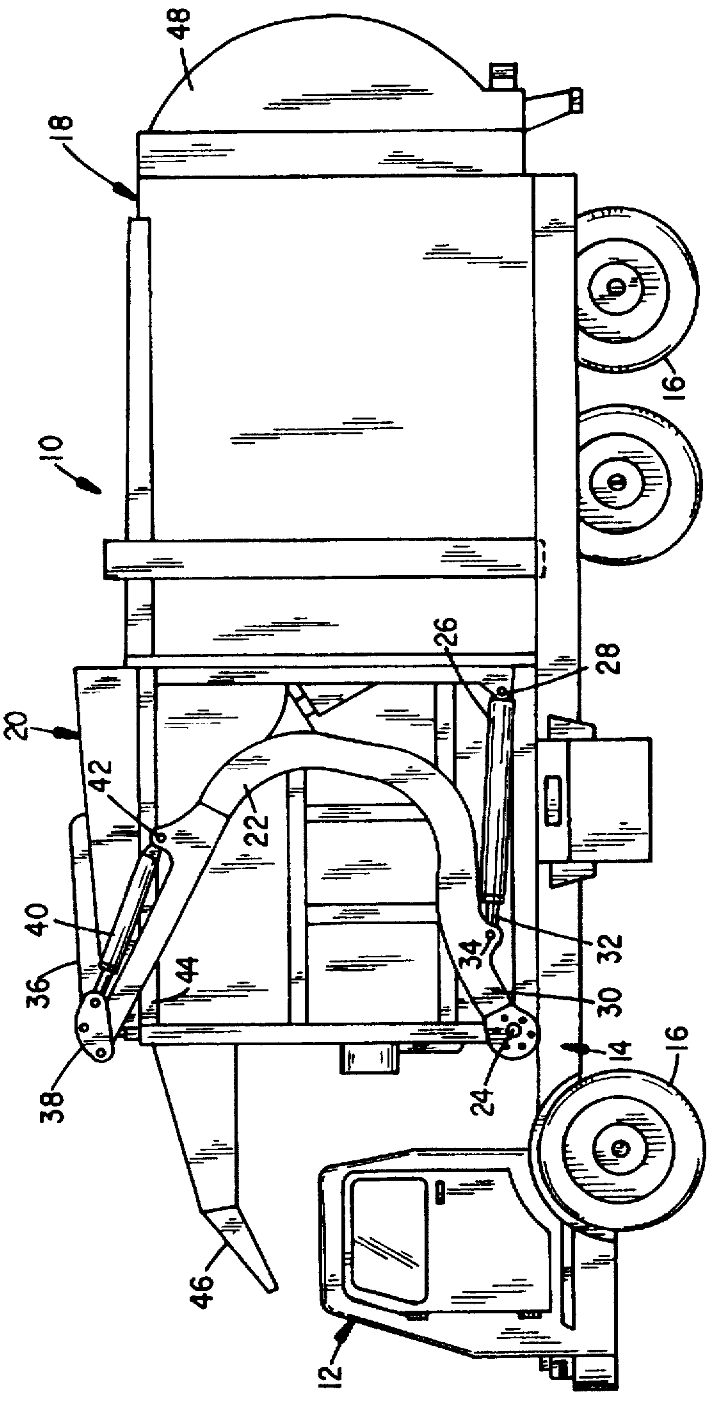
FIG. 1 (PRIOR ART)
FIG. 1 is a representation of a side view of a front-loading refuse vehicle of the unitary body construction associated with the prior art.

As previously discussed with respect to FIG. 1, traditionally most dedicated truck bodies, particularly those dedicated to the collection and disposal of refuse, have been build as unitary body structures which are then mounted on a truck chassis acquired separately. With respect to the truck body of FIG. 1, it should be noted that only the fork arms 36, lift arms 22 and the tailgate 48 can readily be separately replaced. The remainder of the truck body 10 is manufactured as a single unitary structure and, although it can be repaired and patched, this may require a great deal of cutting and welding with respect to patching damaged or heavily worn portions and such repairs will be noticeable. This situation leads to excessive repair and maintenance costs throughout the usable life of the truck body and often requires replacement of the entire body when only a portion is worn or damaged.

Figure 2:
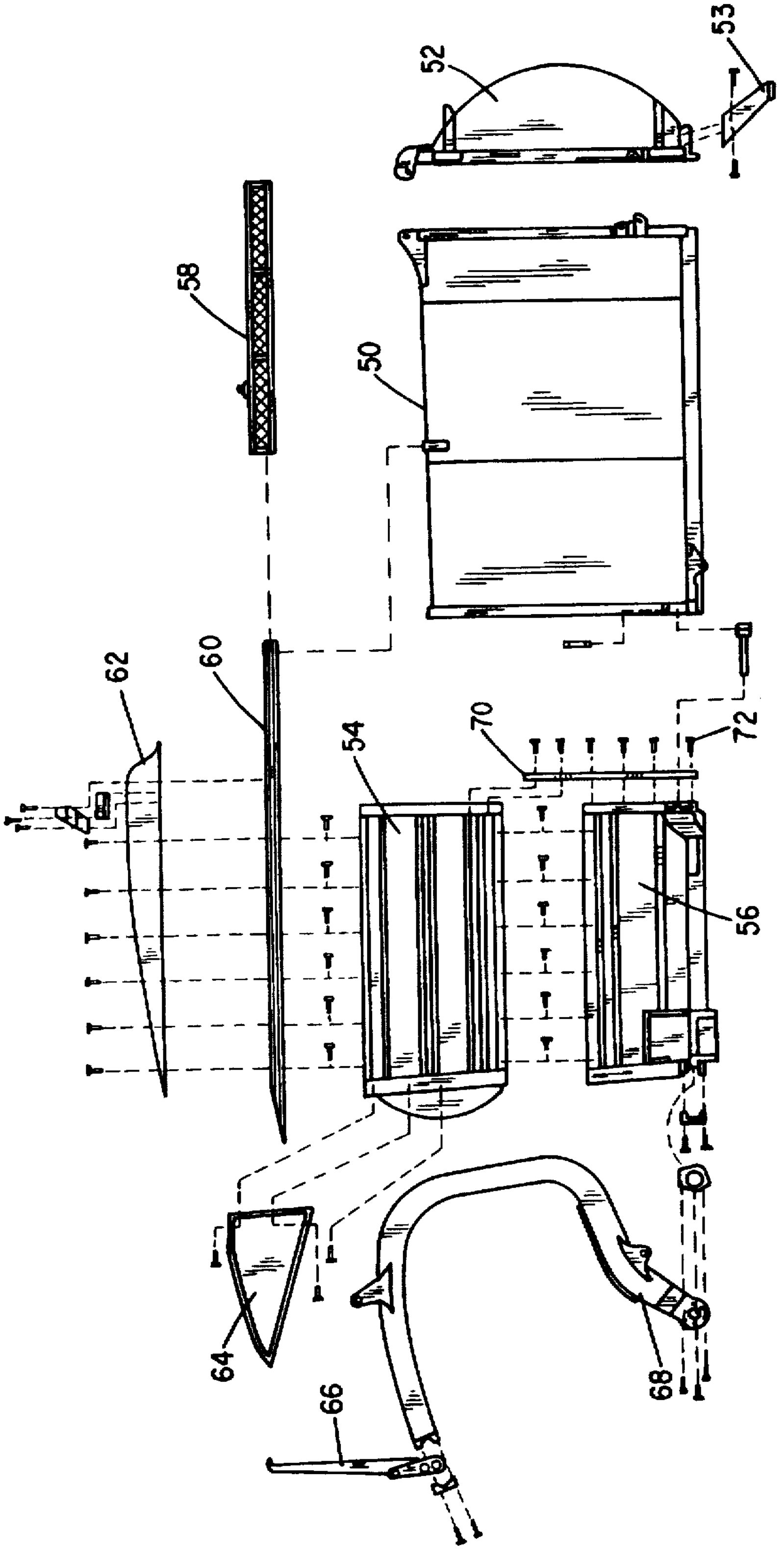
FIG. 2 is an exploded view illustrating the modular concept of truck body construction in accordance with the invention.

FIG. 2 depicts a blown apart or exploded view illustrating the modular subassemblies which may be bolted or otherwise fastened together to form the modular truck body structure in accordance with the invention. The modular subassemblies include a main refuse storage reservoir 50, tailgate assembly 52, upper hopper assembly 54, lower hopper assembly 56, sliding charging hopper door 58 with door track 60, windguard 62, protective canopy or cab spill shield 64, fork arms 66 and lifting arms 68 are also shown. A seal between the upper and lower loading or charging hoppers 54 and 56 and the refuse reservoir body 50 which provides a peripheral seal about the opening between the charging hopper and the reservoir (not shown) is shown at 70. A plurality of bolts as at 72 may be used to removably fasten the modular sections together through mating flanges provided on each of them in a well-known manner.

With this concept, should, for example, the upper reservoir 54 and the door track 60 be damaged by a container dropping on the top of the truck during unloading, as may happen if one or both of the container handles fails, the track 60 and upper charging hopper modular 54 can simply be removed and replaced without the need for disturbing the remainder of the truck body subassemblies. Likewise, other sections or modular subassemblies such as the lower charging hopper 56 which contains the charging hopper floor can be removed and replaced as needed and spares of often used subassemblies can be stocked in readiness for repairs, particularly with respect to those items damaged or worn most often. This clearly represents a savings in maintenance with respect to either having to work with cutting and welding heavy steel plate or paying to replace an entire truck body in order to repair wear or damage to but one section.

Figure 3:
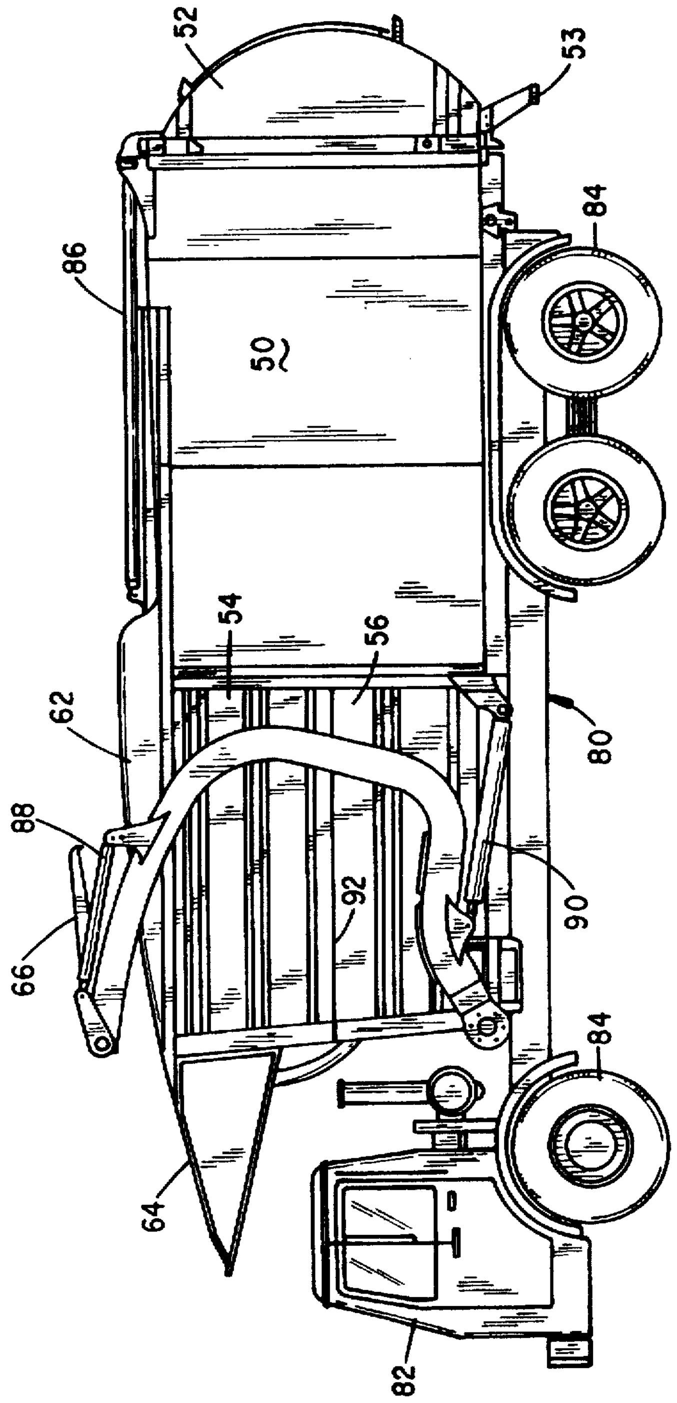
FIG. 3 illustrates the modular subassemblies of FIG. 2 assembled on to a vehicle chassis.

FIG. 3 shows the several subassemblies pictured in FIG. 2 as assembled onto a typical truck chassis 80 with cab 82 and wheels 84 and further including top door operating cylinder 86, fork operating cylinder 88 and arm operating cylinder 90. The juncture between the upper and lower hopper subassemblies 54 and 56 is shown at 92. Of course, with respect to the forks, arms and cylinders, the ones pictured, as above, represent one of a symmetrically situated pair, the other being located identically on the opposite side of the vehicle body.

As can be seen from the illustrations, the modular concept represents a simplified replacement or repair approach to maintaining such a vehicle. While the detailed description is directed to a front-loading refuse vehicle, it should further be noted that this is intended to be but illustrative of the invention and the concept is believed universally applicable to a great variety of different embodiments of refuse collection vehicle bodies and other vehicles readily susceptible to such construction.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. For example, the modular concept of the invention may be employed in other comparable applications where comparable devices are indicated such as, for example, multiple compartment refuse and recyclable collecting vehicles.

What is claimed is:

1. In refuse and recyclable collection vehicle, a dedicated truck body selected from the group comprising top loading refuse vehicle bodies, said truck body comprising a plurality of discrete, independently removable and replaceable modular subassemblies for separate replacement in response to non-uniform wear and damage requirements.

2. The apparatus of claim 1 wherein said plurality of modular subassemblies include a storage reservoir, upper and lower charging hoppers and tailgate.

3. The apparatus of claim 2 wherein said plurality of modular subassemblies further comprise a windguard and cab protector.

4. The apparatus of claim 2 wherein said plurality of modular subassemblies are fastened together and to a vehicle chassis using removable fastening means.

5. The apparatus of claim 1 wherein said storage reservoir said upper and lower hopper subassemblies are fastened together with removable fastening means.

6. The apparatus of claim 3 wherein said storage reservoir said upper and lower hopper subassemblies are fastened together with removable fastening means.

7. The apparatus of claim 4 wherein said removable fasteners include threaded bolts.

8. The apparatus of claim 5 wherein said removable fasteners include threaded bolts.

9. The apparatus of claim 6 wherein said removable fasteners include threaded bolts.

* * * * *